US009877031B2

(12) United States Patent
Mann et al.

(10) Patent No.: US 9,877,031 B2
(45) Date of Patent: Jan. 23, 2018

(54) SYSTEM AND METHOD FOR MULTI-RESOLUTION RASTER DATA PROCESSING

(71) Applicant: Pitney Bowes Inc., Danbury, CT (US)

(72) Inventors: Steve T Mann, Troy, NY (US); Samuel S Roberts, Copacabana (AU)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 15/141,884

(22) Filed: Apr. 29, 2016

(65) Prior Publication Data

US 2016/0321781 A1 Nov. 3, 2016

Related U.S. Application Data

(60) Provisional application No. 62/154,147, filed on Apr. 29, 2015.

(51) Int. Cl.
*H04N 19/31* (2014.01)
*H04N 21/4728* (2011.01)
*H04N 21/854* (2011.01)

(52) U.S. Cl.
CPC ......... *H04N 19/31* (2014.11); *H04N 21/4728* (2013.01); *H04N 21/85406* (2013.01)

(58) Field of Classification Search
CPC ........................... H04N 19/31; H04N 21/4728
USPC ....................................................... 345/428
See application file for complete search history.

(56) References Cited

U.S. PATENT DOCUMENTS

| | | | | |
|---|---|---|---|---|
| 7,227,116 B2* | 6/2007 | Gleckler | ................... | G01J 3/02 250/208.1 |
| 2002/0033837 A1* | 3/2002 | Munro | .................. | G06F 3/0481 345/654 |
| 2002/0085007 A1* | 7/2002 | Nelson | ................ | G06F 15/8053 345/505 |
| 2004/0207632 A1* | 10/2004 | Miller | ...................... | H04N 1/00 345/599 |
| 2004/0227703 A1* | 11/2004 | Lamvik | ............. | G02B 27/0172 345/76 |
| 2010/0215334 A1* | 8/2010 | Miyagi | .................. | G11B 27/11 386/287 |

OTHER PUBLICATIONS

"ARCGIS 9.2 Webhelp Topics", Information Based Indicia Program Host System Specification, Sep. 22, 2008, pp. 1-40, 1-29, 1-24, 1-40.

* cited by examiner

*Primary Examiner* — Devona Faulk
*Assistant Examiner* — Hai Tao Sun
(74) *Attorney, Agent, or Firm* — Michael J. Cummings; Charles R. Malandra, Jr.

(57) ABSTRACT

An improved method and system are provided for constructing square multi-resolution tiles for use with spatial multi-resolution raster data. This improvement permits more efficient storage, processing and display of raster tiles at different resolutions. A base level cell size is defined for a highest required resolution. Lower resolution cell sizes are defined for lower resolution tiles. The lower resolution cell sizes are integer multiples of the base level cell size. A base level tile size is defined such that the integer multiples, as used in the step of defining lower resolution cell sizes, are all integer factors of a number of cells on a side of the base level tile. Using this technique, the boundaries for the base level tile and the multi-resolution tiles are coextensive.

13 Claims, 6 Drawing Sheets

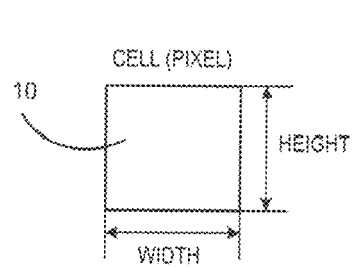
FIG. 1A  FIG. 1B
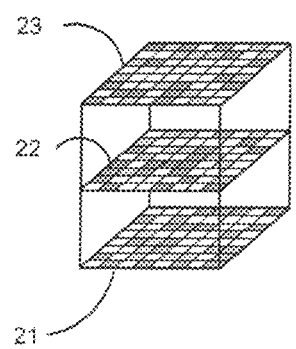
FIG. 2

SYSTEM AND METHOD FOR MULTI-RESOLUTION RASTER DATA PROCESSING

RELATED APPLICATION

This application claims the benefit of prior provisional application 62/154,147 filed Apr. 29, 2015, and that application is hereby incorporated by reference.

TECHNICAL FIELD

This invention is directed to an improved computer architecture and method for storing, accessing and displaying raster data.

BACKGROUND OF THE INVENTION

Grid data (raster data and imagery) is stored on an evenly spaced grid of cells of uniform dimension. It may represent point samples of a continuously variable manifold, or estimations of the average value of some measurable parameter within the grid cell. It also encompasses geolocated imagery.

The size of gridded datasets has increased substantially over the years and this growth has outstripped the capacity of computing power to manage the grid data. This trend will continue for the foreseeable future. It is necessary, therefore, to design storage formats which help computers to access, visualize and process this data in an efficient and timely fashion.

SUMMARY OF THE INVENTION

An improved method and system are provided for constructing square multi-resolution tiles for use with spatial multi-resolution raster data. The Multi-Resolution Raster ("MRR") improvement described herein addresses at least two key failings of current grid formats: storage efficiency and multi-scale visualisation. This improvement permits more efficient storage, processing and display of raster tiles at different resolutions. In particular, this is useful when only a particular feature, or region, of interest in a spatial display needs to be shown at a higher resolution, while lower resolution is adequate for the rest of the display. MRR is a raster data format that encompasses all types of raster data—image, classified, discrete and continuous. Although there are already many existing raster data formats, there is a need for a unifying format that also handles all types of data and provides new capabilities to improve the user experience when visualizing and processing raster data.

Using this technique, a base level cell size is defined for a highest required resolution. Also, lower resolution cell sizes are defined for lower resolution tiles. The lower resolution cell sizes are integer multiples of the base level cell size. A base level tile size is defined such that the integer multiples, as used in the step of defining lower resolution cell sizes, are all integer factors of a number of cells on a side of the base level tile.

The spatial multi-resolution raster cell data is sampled at the highest required resolution and stored in base level size tiles. The spatial multi-resolution raster cell data is also sampled at the one or more lower resolutions, with the results stored in their respective multi-resolution size tiles. Using this technique, tile boundaries would be coextensive for a base level tile and for a multi-resolution tiles that could be created for the same geographic region.

In a preferred embodiment, a region of interest is identified for display on a spatial map. Tiles formed at higher resolution are selected and displayed for portions of the spatial map that include the region of interest. Tiles formed at lower resolution are selected and displayed for the remainder. Tile boundaries for the higher and lower resolution tiles align without any spatial overlapping or gaps.

In a further embodiment, the spatial multi-resolution raster data is comprised in a single compound file. The single compound file may include a master file table that includes data that defines a purality of subfiles contained in the single compound file. The subfiles may further include a plurality of raster data fields which are comprised of event data, wherein the event data is associated with a specific time marker. The event data may include data for a same geographic location at different points in time. Also, changes to event data can be stored as new data with a new time marker, thereby allowing temporal changes and editing to raster data without need to form a whole new set raster data.

The spatial multi-resolution raster data may include a plurality of fields. Such fields may include one or more of the following: RGB image data, numeric data, time data, text string data. Multiple bands of data are stored for more than one data field for raster data cell values. Data compression is used to efficiently store the single compound file.

In yet a further embodiment, the spatial multi-resolution raster data is stored in a data pyramid structure comprising a pyramid base level and one or more lower resolution overview levels. Each level is arranged to include a spatial tile map that records what tiles exist in each respective level.

BRIEF DESCRIPTION OF THE DRAWINGS

FIG. 1A is an exemplary raster cell.

FIG. 1B is a group of raster cells in a grid.

FIG. 2 depicts bands of raster data corresponding to the same set of raster cells in a grid.

DETAILED DESCRIPTION

Figure 3:
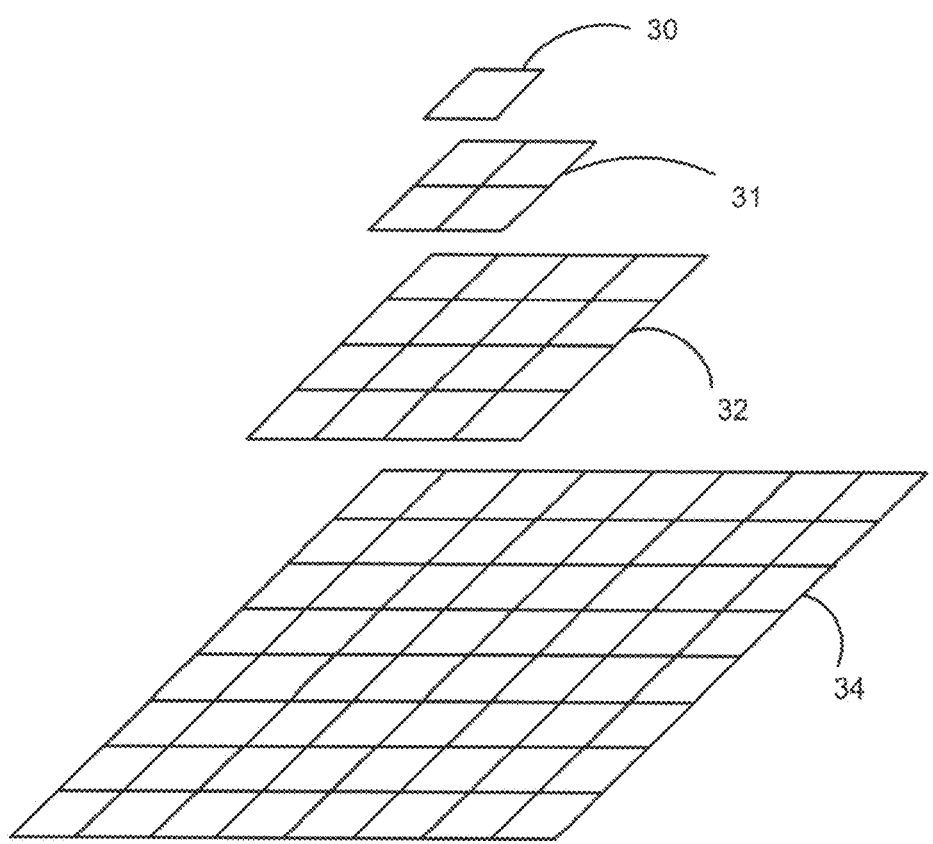
FIG. 3 depicts a raster data pyramid arrangement.

In its simplest form, as shown in FIG. 1B, a raster consists of a matrix 11 of cells 10 (or pixels) organized into rows and columns (or a grid) where each cell 10 contains a value representing information. Each cell's value represents the phenomenon portrayed by the raster dataset such as a category, magnitude, height, color etc. Cell values can be either positive or negative, integer, or floating point, depending on the type of data being represented using raster. In general, discrete (numeric or categorical) data is represented using integer values. Cell values can also have no-data value, representing absent of data at particular location.

For example, as shown in FIG. 1A, a raster cell 10 representing elevation (Height) covers an area of 100 square kilometers. If there were 100 cells in this raster, each cell would represent one square kilometer of equal with and height (that is, 1 km×1 km). Cell size is the spatial resolution of the image. If cell size is said to be 200M then one cell represents 200 meters on ground. The cell must be small enough to capture the required detail but large enough so computer storage and analysis can be performed efficiently. Cell size defines the spatial resolution of an image. Image resolution is represented by the cell size. Image resolution defines the level of detail of the image.

Bit depth (also known as pixel depth) of a cell determines the range of values that a particular raster file can store, which is based on the formula $2^n$ (where n is the bit depth).For example, an 8-bit raster can have 256 unique values, which range from 0 to 255.

Data is stored in an MRR in one or more fields, each of which contains one or more data bands. Each field can contain data of four fundamental types:

Image: 24 bit RGB image data.

Classified: An unsigned integer (1/2/4/8/16/32/64 bit) index is stored pointing into a classification table. The MRR can store many classification tables, of unlimited size. Tables can contain many fields with unique data types including bit, numeric, date time, colour, strings (fixed and variable length) and BLOBs (fixed length). The MRR API will expose the index band and all the fields in the table as virtual bands allowing the raster data to be treated as either discrete or continuous.

Numeric (discrete): Contains bit (1/2/4) or numeric (integer, float, complex, date time) data bands. Implicit assumption that the data value for a cell represents the average value of the measured quantity over the cell region.

Numeric (continuous): Contains bit (1/2/4) or numeric (integer, float, complex, date time) data bands. Implicit assumption that the data value for a cell represents the measured quantity at the center of the cell region.

There is no restriction on how may fields are stored in MRR—nor on the type of the fields. So it is possible, for example, to store both image data and numeric data in a single MRR. In an MRR fields are spatially independent.

A raster dataset may need more than one data field to represent a cell value like in case of color R, G and B component fields are needed. Such data field is called band. Raster band represents the single matrix of cell values of homogeneous type. Exemplary bands 21, 22, and 23 depicting R, G, B components for color in the visible spectrum are depicted in FIG. 2. Raster datasets can be single band or multiple bands. A raster with multiple bands, as depicted in FIG. 2, contains multiple coincident matrices of cell values representing the same spatial area. In multi-band raster, as depicted in FIG. 2, each cell has more than one value associated with it, which usually represent segment of spectrum. Single band raster can be visualized as gray scale or use a color lookup table to get the RGB value corresponding to a value in cell.

Each field contains one or more data bands. Data bands may be 'stored' or 'virtual' indicating the band data is actually stored in the file or is obtained on the fly either from a stored band or a classification table. In general, each band will have the same data type and all bands will be intimately related. For example, a magnetic survey may store measured magnetic field components in three bands, or a magnetic tensor in five bands. Landsat channels may be stored in multiple bands. Image data fields will store a colour band (RGB) and automatically create virtual bands for each colour component. Classified fields store an integer index band and then automatically create virtual bands for each field in the classification table used by the field. The API preferably assumes that if the user requires a field, he is likely to require all of its bands and so all bands are loaded when a tile is mounted.

The concept of the 'null' value is advanced in the MRR. A bit mask is stored for each field (applying to all bands of that field) recording whether the cell is valid or invalid. If invalid, the value of the data in the cell can be used to classify exactly why it is invalid. Invalid classifications include: 'empty', 'null' and 'outside' invalid classifications. An 'empty' cell is a cell for which the data values are not known, but could potentially be knowable. A 'null' cell is a cell for which it is known that there is no value. A cell that is 'outside' is outside of the allowable rang of a raster of a particular format. The bit mask is, in general, highly compressible.

Image pyramiding, depicted in FIG. 3, is a technique for creating multiple resolution raster images out of the base image. This technique results in lower resolution images analogous to thumbnail images. Multiple resolution images created in this manner are called the levels of the pyramid. A new level can be generated by either increasing or decreasing the resolution. As, seen in FIG. 3, level 34 is the base level with decreasing resolution at levels 32, 31 and 30.

Usually base resolution image level is assigned the highest number "N," and next level N-1 is generated by lowering the resolution by half. So the level N-1 image would be half the resolution of Level N image, this also means its half in size as well.

In the example depicted in FIG. 3, assume the size of the given image is N by N cells. Where $N=2^n$ and n is the level index. The mage pyramid is then composed of n levels of the same image at different resolutions. At the bottom of the pyramid is the given base resolution image, 34. Each set of 2×2 neighboring pixels is replaced by their average as the pixel value of the image at the next level, 32, 31. This process, which reduces the image size by half, is repeated n=log2 N times until finally an image of only 1 pixel (average of entire image) is generated as the top of the pyramid, level 30.

Figure 4:
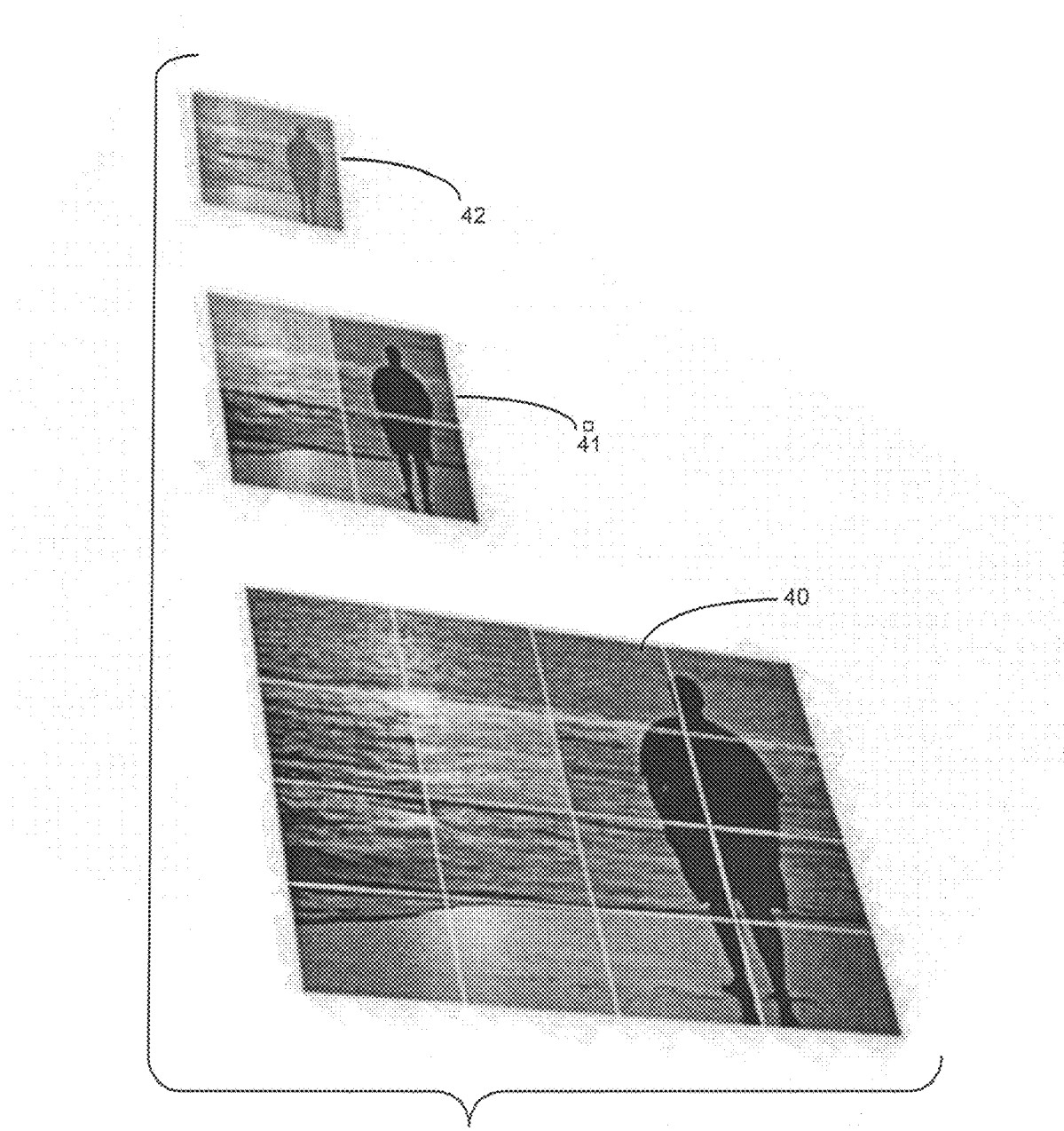
FIG. 4 shows raster tiles at different resolutions for a same image.

The image, depicted in FIG. 4, can be further divided at each level, 40, 41, 42, into tiles as shown. In such case, the top of the pyramid 42 will have just one tile. If the new level of the pyramid is generated by lowering the resolution from the base resolution of the image then the new level is referred as an overview level. If the new level is generated by increasing the resolution from the base level then the new level is referred as under view image.

There is a conceptual difference between raster and grid dataset, as those terms are used. If dataset has band values which are from visible spectrum then such dataset is referred as raster, if band values are some other representations like height value, classification value, radio signal strength etc. then such dataset is referred as grid. However, in this description, the terms raster and grid should he considered to be interchangeable.

In the preferred embodiment, an MRR is stored in a single compound file. A compound file is a collection of files all contained within a single file. It follows the exam of the ECW format which uses a single compound file. The benefit of a single file is simplicity for users. The negative is the requirement to manage the compound file to maintain compactness. The risk is that large files carry greater risk of corruption and loss if interruptions or failures occur during write operations.

Figure 7:
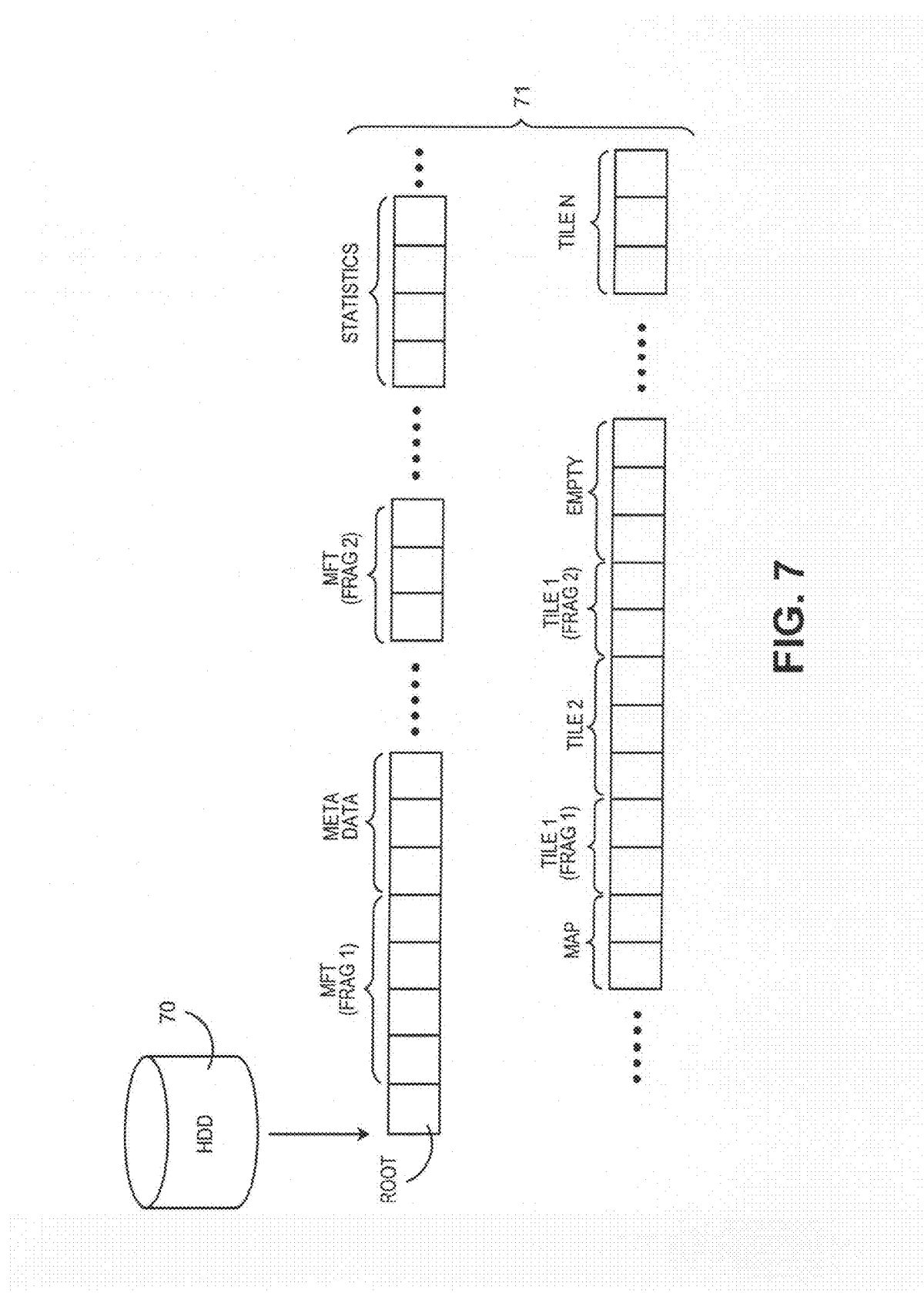
FIG. 7 shows details of the MRR compound file structure.

An MRR is a single data file containing all raster data and raster metadata. (See FIG. 7). The underlying storage mechanism is a 64 bit compound file 71 enabling raster datasets of virtually unlimited size. The flexibility of the compound file 71 allows a MRR to be built progressively, edited and modified over time. The 64 bit compound file system stores a virtually unlimited number of files, which can be of virtually unlimited size, in a standard file. The maximum size of the system file may be limited by the underlying operating file system or restrictions of the file system in use for the volume on which the file is stored. The compound file 71 is designed to store huge files, or a huge number of files, efficiently with a minimum of overhead. A compound file 71 is preferably comprised of a number of clusters of fixed size. The default cluster size is 128 bytes.

The compound file includes functionality of a file system inside a file. The file 71 is broken into 64 byte blocks and the sub-files occupy an integer number of these blocks. A sub-file may be fragmented so that it is contained in two or more runs of blocks. The first 'root' cluster contains an identification code and stores a variety of parameters describing the compound file 71. The first sub-file is the "Master file table" (MFT). This contains all the information about all the sub-files in the compound file 71.

Compound file 71 has a sub-file for the raster metadata (this may be split into a number of different sub-files). This data is loaded when an MRR is mounted. In addition, it stores spatial tile maps, statistics and tile data in separate sub-flies. Throughout the compound file 71 there may be empty blocks that, for various reasons, do not contain any data.

The MFT contains a record for every sub-file in the compound file 71. Each record is 128 bytes and contains a variety of information including the sub-file size etc. Generally, a certain amount of space is reserved at the head of the compound file 71 to store the MFT. Additional space will be allocated elsewhere in the compound file 71 as required.

All sub-files in a compound file 71 are referred to by number (a 64 bit integer) and do not have an ASCII name. There is no directory structure in an compound files 71. Sub-file numbers are issued by a server which reuses sub-file numbers that become freed by deletion.

Cluster chains are maintained to describe what clusters each sub-file in the compound file 71 occupies. A cluster chain is a list of pairs, each of which records a range of contiguous clusters. For each sub-file, space is allocated for our cluster chains links in the MFT. More space will be allocated elsewhere in the compound file for each sub-file if required. The location of empty clusters is recorded in an empty cluster chain which is recorded in a system file. These are reused as required, depending on the rules governing the allocation of clusters for a sub-file.

The compound file 71 can maintain an in-memory cache. It supports LZ77 and LZMA compression and can write files using these lossless compression techniques in two ways depending on the size of the sub-file. A small sub-file will be cached in memory and only compressed and committed to the compound one it is closed. On opening, it will be decompressed and cached in memory again. Large sub-files can be stored in a paged fashion which allows them to be accessed randomly. The sub-file is split into multiple pages, and each page is stored as a separate sub-file. This enables very large datasets to be stored using lossless compression and accessed both sequentially and randomly with reasonable efficiency.

An MRR defines a base resolution at which all source data is stored. An MRR is created by importing data into the base level of the MRR. This data has a standard grid structure with a defined origin coordinate, cell size and coordinate system.

An MRR maintains a pyramid of lower resolution levels, as described above in connection with FIG. 3. The MRR builds a binary pyramid of resolution levels above the base level where the resolution of each level is half the resolution below it. This allows data to be extracted from the MRR at a resolution which matches the requirements of the user. This enables seamless zooming in image processing applications and high data extraction performance.

Primarily for the purposes of efficient and high quality visualisation, the MRR contains a data pyramid of overviews (where the cells are larger than the base level cell size). The API also allows generation of underview levels in the pyramid (where the cell size is smaller than the base level cell size). Each overview level contains a representation of the data at a resolution two times lower than the previous level. The data pyramid is not truncated the peak tile will contain a single cell of data. The user is able to read data from any level of the pyramid but can only inject data into the base level. Storing this pyramid increases the size of the dataset by approximately 33%, but it is an essential enabling technology for visualisation. The pyramid makes possible high performance visualisation at any scale and, critically, ensures that visualisation is high quality.

An MRR is tiled. At the base level, all data is stored in tiles of a defined size. This allows a sparse representation of the data and minimises storage requirements. Efficient support for sparse grids is particularly important in applications such as LIDAR DEMs where, for example, a grid may be required for a dataset that follows a road or railway line. All data in the MRR is stored in tiles. Tiles can be any size, but are generally square, with a size equal to a power of 2 and divisible by 16. For example it may be 256×256 or 1024× 1024 cells in dimension. Although the tiles are arranged on a rectlinear grid, they may be sparse. A spatial map is used to identify whether a tile exists at any position. The data for each tile (for each field) is stored in a file in the compound file structure.

The underlying flexibility of the compound file structure means data can be stored like a database. Accordingly, spatial data is stored in tiles, and each of these is stored in a sub-file.The compound file system stores the tile sub-files the MRR file as it sees fit. A spatial map is also maintained and written into other map sub-files. These map sub-filesfiles record where tiles are extant and identify the file name of the tile sub-files. So, to find data at any resolution level one consults the spatial map for that resolution to identify if a tile exists—if so the tile file name is retrieved from the map and the compound file can then load the tile data.

The data in each tile may, optionally, be compressed. (All other system files such as maps, classified data tables and metadata can also be stored using lossless compression). Classified, discrete and continuous data can be stored using lossless compression (LZ77 or LZMA). Image data can be stored without compression, with standard lossless compression or with any supported image compression codec—either lossless or lossy. A number of techniques to improve the compressibility of numeric data are provided including a wide variety of raw data types, optional decimal point restrictions, scaling and translation and forward prediction.

An MRR employs lossless data compression. Efficient open-source lossless data compression algorithms are employed to compress the data in each tile. In addition, mechanisms are provided to allow users to minimise the resolution of the data where it is appropriate. These techniques improve compression ratios.

Using data tiles allows such compression techniques to be employed. Traditionally, rasters have not been able to employ compression. Sparse storage and compression will typically reduce the size of a raster file by 10×. Any compression 'codecs' can be used if implemented. For example we have lossless coders like LZMA, ZIP and PNG as well as lossy codec like JPEG. Lossy codecs enable higher rates of compression.

An MRR supports temporal changes, editing and versions. If a huge grid is modified, storage requirements are minimised by not duplicating the grid, but by storing the edit in the grid file. An MRR may be edited in multiple events which allow image processing algorithms to visualise the MRR data as it changes over time. An event may record a cell 'edit' (which occurs within a defined window) or a grid 'version' which completely replaces the previous events. This design minimises storage requirements and maximises data extraction efficiency. Data in an MRR is stored in a series of events which are ordered in time. An event may record a relatively minor edit of a cell or a region of cells, or it may record a new copy of the entire dataset. In an event, you can add a new field but you cannot delete existing fields or modify their structure. By allowing small changes to be made to huge datasets without duplication, the MRR minimises resource requirements for data storage. The MRR API will allow raster data to be extracted at 'the latest' point in time, or at any previous point in time. It will extract data from a point in time to the latest point in time, or over a period of time.

Using the temporal aspect of events, the user can add new data to a raster in a new event that occurs at a specified time. MRR can then interpolate in four dimensions—a user can acquire an estimate for a data point that is at a coordinate (x,y,z,w) where z is the resolution dimension and w is the time dimension. Data can be extracted at a time, or for a period of time. Comparisons can be made on the fly of data at different time points.

An MRR supports bit, integer and floating point data types as well as classified data. To maximise compression and minimise wastage, the MRR supports bit (1, 2, 4 bit) as well as integer and floating point data types. Text and discrete data are supported via classification tables and index storage. An MRR also supports multi-banded continuous and discrete data and raster imagery. An MRR can store one or more multi-banded fields. The field describes the data type for all bands of that field. Fields and bands can be added or removed in events. For each field a mask is stored recording the validity of each cell (valid, empty or null). Raster imagery is generally represented as three band unsigned byte data, utilising a single mask.

Figure 8:
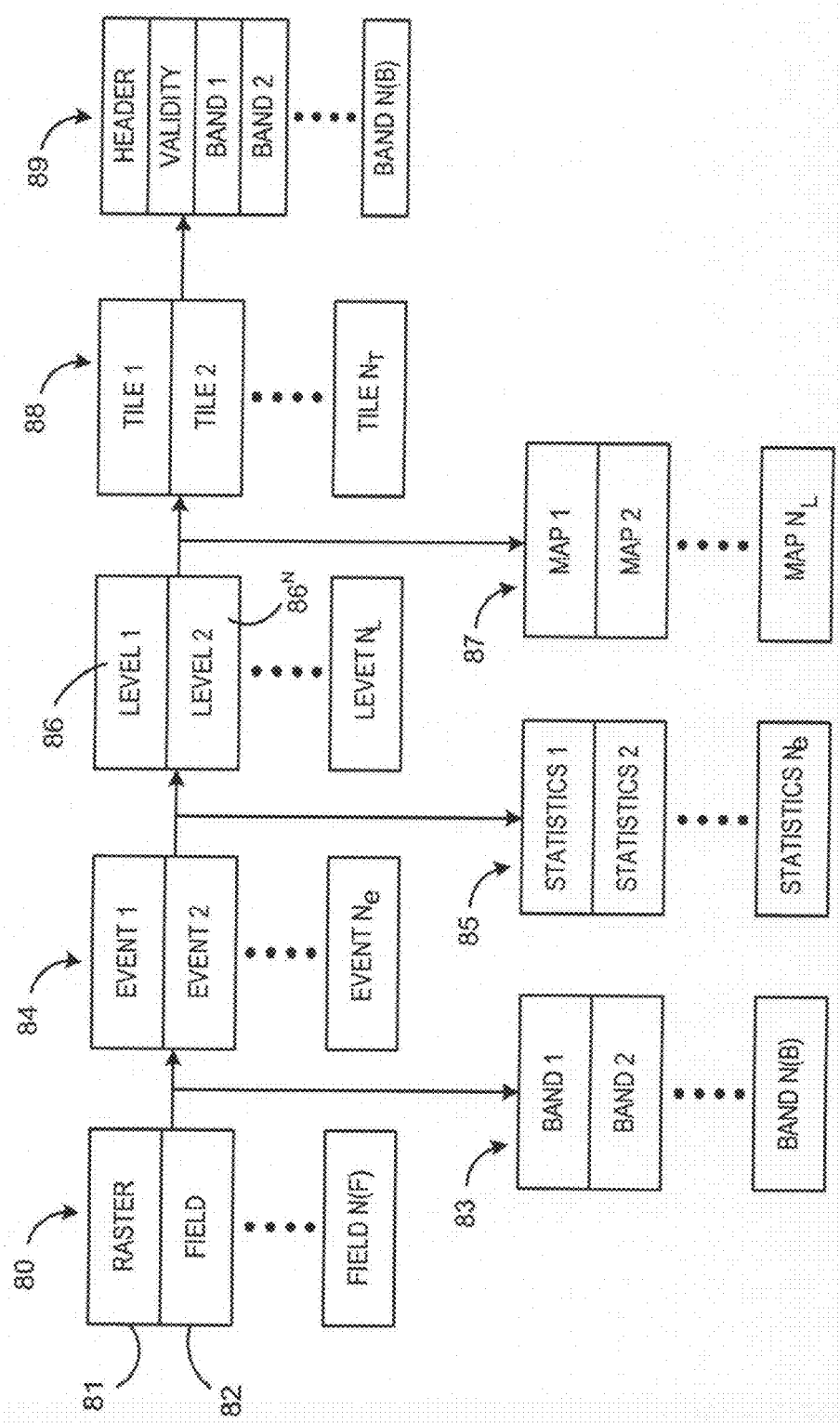
FIG. 8 depicts internal structure and relationships of the MRR raster data.

FIG. 8 diagrams an exemplary way that the MRR raster can be structured. The raster 80 has some key meta data 81. Then, it will contain one or more fields 82. Each field 82 will store further meta data for the bands 85 that the field 82 contains. Each field 82 can contain one or more bands 83. Data is added to a field 82 in an event 84 which occurs at some specific time marker. Each field 82 can be subject to one or more events 84. Summary statistics 85 will be stored for the data in each event 84.

MRR stores comprehensive and high quality statistics in the MRR file. Having statistics available to hand (and having the overview pyramid structure) ensures that high quality real time visualization is possible. MRR can compute distribution statistics in a single data pass for rasters of (virtually) unlimited size.

For each event 84, a data pyramid is built consisting a series of levels 86. The levels 86 include a base level and zero or more overview levels. Each event will contain one or more levels 86. Each level 86 will have an associated spatial tile map which records what tiles 88 exist in the level 86. A level 86 will contain one or more tiles 88. In practice it may contain millions of tiles 88. A tile 88 is stored in a sub-file 89 in the compound file with a header, cell validity information and a data block for each band. The band data is generally compressed and/or encoded to minimise file storage requirements.

One benefit of MRR is that huge rasters are enabled. It addresses the problem of huge dataset management by minimizing storage requirements through sparse storage, efficient compression and progressive editing. It addresses the problem of visualization through thing and by maintaining a data pyramid that enables efficient data visualization at any scale. Many huge datasets are extremely sparse—for example a lidar survey following a railway line. The MRR does not store anything where there is no data, but has the flexibility to add additional data at any time.

Multi-Resolution-Tile Extension to MRR Raster Format

Existing MRR raster files require, like all current raster datasets, that the raster structure be defined at the time of creation. This includes parameters such as the raster origin, base level cell size, base level tile size etc. However unlike most existing raster formats an MRR file does not require the raster size (defined in rows and columns) to be specified at the time of creation. Once an MRR file has been created its structure typically cannot be modified or updated. This constraint means properties like the raster cell size and the size are fixed (at the base level) when an MRR is created and cannot be modified unless a new MRR file is created.

To overcome the requirement of having to store raster data at a fixed cell size at the base level (i.e., the raw data level) a further improvement is proposed to allow the end user of the API to create and store raster data in the base level of the raster file at variable cell resolutions. To achieve this capability while also maintaining raster file consistency, performance and support for fixed resolution data the support for variable cell resolutions is partitioned at the tile level. This further capability is added to the API and MRR format to allow the cell size of base level tiles to be varied on a tile by tile basis according to a set of rules.

Creation and Storage Constraints

Figure 5:
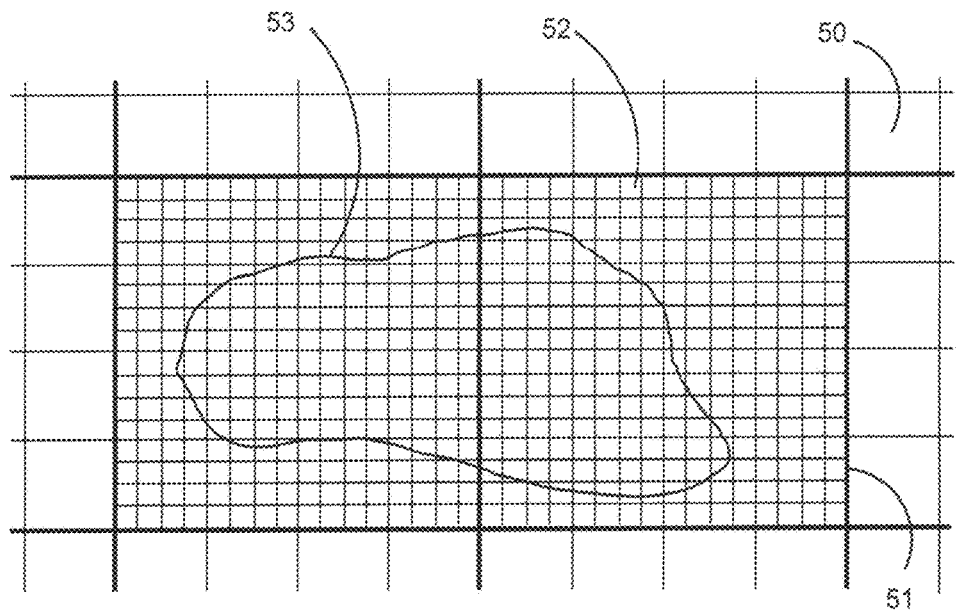
FIG. 5 depicts an example of a raster Image having multiple resolution tiles.

To maintain integrity of the raster dataset all tiles in the base level must have a constant size and alignment. Any change that is made to the cell size of a tile must follow the tile boundaries. That is, a single tile can only contain data of a constant cell size. FIG. 5 shows a polygon which is intended to represent the actual boundary 51 that separates a region of high (52) and low resolution (50) raster data. In order to fit this data into a multi-resolution-tile (MRT) dataset a user would be required to partition the source data regions so they align with the base level raster tile structure. In this example the tile boundaries along which the storage resolutions must follow are bolded and marked 51. To accommodate both high and low resolution data in the MRT structure it would be necessary to fully populate both the low (50) and high resolution tiles (52) by resampling the source data at the required resolution of the destination tile. In this example, the regions of low resolution data (52) which lie within the high resolution tile boundary 51, but outside the high resolution source data set, would need to be resembled to the higher resolution cell size to fully populate the tile. In this example, a feature of interest 53 is the reason that higher resolution is desired within the high resolution region 52.

To create a multi-resolution-tile (MRT) MRR file the following storage constraints will need to be met: (1) The file will be created with a fixed base level tile size and cell size (the highest required resolution) which forms the core geometry of the raster; (2) the boundaries of all tiles and cells in the base level must align without overlap or gaps; (3) all cell sizes must be integer multiples of the base level cell size; and (4) permitted cell sizes for an MRT tile must be integer multiples of the base level cell size and integer factors of the base level tile size.

To illustrate these constraints consider the following example. As a consumer of the API wishes to create a single MR file which stores data at the following cell resolutions; 5 m, 10 m, 15 m, 30 m, 60 m, 90 m, 180 m. The highest resolution cell size required is 5 m which would be used to set the base level cell size for the raster at the time of creation. Each of the lower resolution cell sizes we integer multiples of the base cell size which meets one of the constraints. To accommodate the data efficiently within the MRR tile structure, a suitable base level tile size needs to be defined that will also meet the integer factor constraint for all the required it sizes. For a conventional MRR, the base level tiles would normally be created with a size of 1024×1024 cells. However, in this example, the required cell resolutions do not result in integer factors for ail resolutions with a tile size of 1024. So an alternative tile size is required to produce integer factors for all cell resolutions. An approximate tile size to 1024 which also results in integer factors for all required cell sizes is 900×900 cells. So for this example, a tile size of 900×900 would meet the other constraint and permit all required cell resolutions to be stored in a single MRT MRR. In this example, however, it would not be possible to store cell sizes of 70 m or 120 m as they do not meet the integer factor tile constraint with a size of 900×900.

To accommodate both MRT and regular tiles within a single MRR file the system will store some additional metadata with each MRT tile to record the stored cell resolution. Tile data will be stored and retrieved at its nominated resolution which will significantly reduce file and in-memory requirements for accessing or storing low resolution tiles. To maintain compatibility with other API functions and MRR files which have a fixed cell size the system will allow tiles and cells for both MRT and regular tiles to be accessed using normal X and Y cell coordinates. To achieve this with MRT tiles the X and Y cell coordinates will be transformed on-the-fly to yield the reduced resolution cell coordinates. Interpolation methods to covert between a reduced resolution tile cell and a regular tile cell will be nearest neighbor implicitly.

Creating and Accessing a Multi-Resolution-Tile (MRT) MRR

Creating a MRT MRR file would be done in the same way as a standard MRR file by specifying the raster Info, raster origin, base cell size, fields, bands etc. To read or write data will require the use of a new random tile iterator which is added to provide access to tiles at their stored resolution. By default, each tile will be created with a cell size equal to the base cell size of the raster. However, a user will be able to specify a reduced resolution factor for each tile before adding data to it. The user will be required to maintain the relationship between the coordinates and world coordinates in the normal way to ensure tiles are created with the correct cell resolution and data. Reading the data from an MRT tile will require the user to check the tiles stored resolution factor and use that factor as the cell increment to looping through the tile data values.

All existing API access iterators and processing operations will behave in exactly the same way on MRT and regular MRR raster's. That is, all tile data will be accessed at the base level cell size. It may be possible for us to expose the variable cell resolution property of an MRT in some of the standard access iterators (e.g. sequential) which would also allow an end user of the standard API methods to operated directly on the variable resolution data or to implement custom processing operations with these iterators if they wish.

Pyramid Creation and Storage

The generation of an overview pyramid for a new MRT MRR file will need to be aware of the variable cell resolution and tile storage structure and be able to persist this through the pyramid as much as possible to maintain the compression ratio efficiency of the base level. If the pyramid generator was unable to do so then the overview pyramid would be much larger than the raw grid data. The generation of the overview pyramid for MRT tiles will be complex and will likely represent the largest proportion of work required to implement and support multi-resolution-tiles. It is also likely that the storage requirements for an overview pyramid in an MRT dataset will be less efficient than an equivalent single resolution dataset as the storage efficiency of the reduced resolution tiles will decrease as they are merged with higher resolution tiles throughout the pyramid.

The MRT extension to the MRR file format and API is accommodated with a few key chances to the behavior of the API, MRR file format and application. It offers a simple and flexible mechanism for storing and accessing multi-resolution data within a single raster file while still maintaining support for API and processing operations. The primary limitation of this implementation will he that any output file generated from an existing processing operation will be normalized into a single resolution raster on output. In this case the output file could potentially be much larger that the input file.

Multi-Resolution-Tile Feature Summary

An MRT MRR file will have a single base tile and cell resolution but will optionally be able to store cell data in a tile at a reduced resolution. Supported tile cell sizes must be integer multiples of the base cell size. Supported tile cell sizes must be an integer factor of the base tile size. MRT spolution potentially offers higher storage efficienly over large areas where multiple resolution data is used (>2 orders of magnitude) when compared to storing data over the same area at a fixed resolution. It will be supported throughout the existing API and processing modules but these will only operate at the highest base cell resolution. It will require new tile iterator to create tiles and directly access data at the stored resolution. It will require data to be stored at a single resolution per tile.

In addition to adding the new MRT support and access aerator to the API, an existing grid merge tool can be modified to permit an end user of the application to take multiple single resolution raster's and merge them into an MRT MRR file. If the user chooses to create an MRT MRR raster as output then the merge operation would use the new iterator to output tiles according to the required raster resolution order. An MRT tile would be created at a lower resolution if and only if, the output tile is covered completely by a raster with lower resolution data. Tiles would be created in order of highest to lowest resolution over any given region were there is now overlapping data and the storage constraints are met.

Small Multi-Resolution Input MRR Could Become Huge Output MRR

If a user of the API or raster tools were to use one of these new MRT MRR files, which has been massively compressed due to large regions of low resolution data, as the input to a processing operation, then the output file generated could 100's of times larger than the size of the input file. The reason for this huge size increase is that the existing processing operations would see the MRT resolution raster as a single resolution raster with a cell size equal to the base resolution cell size.

Resolution Constraints

Figure 6:
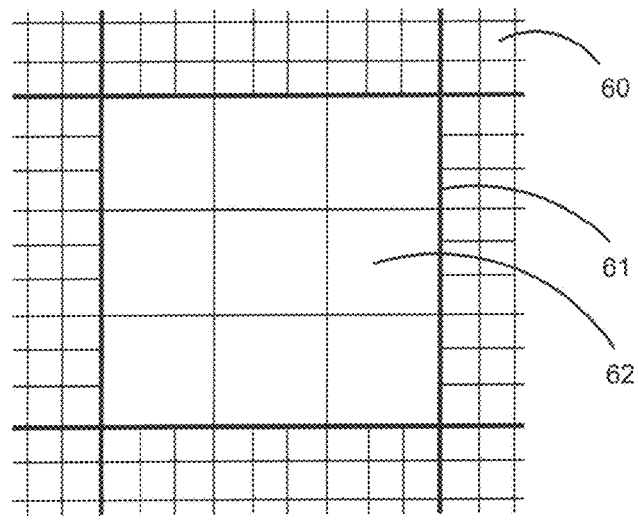
FIG. 6 depicts a second example of an image with raster tiles having different resolutions.

Support for storing lower resolution cells within an MRT tile will be constrained by the base level cell resolution and the base level tile size. The cell origin for all tiles will be anchored to the tile corner and all stored data must fit into the tile exactly (with no overlaps or gaps). This constraint is demonstrated in FIG. 6 where the native (highest resolution) data 60 is stored as a 9×9 array and the low resolution tile data 62 is stored as a 3×3 array. The base tile size in this case is 9×9 cells which is able to accommodate a lower resolution cell size of 3×3 as it is an integer multiple of the base cell size and a factor of the tile size. Tile border 61 separates the high and low resolution tiles.

Although the invention has been described with respect to preferred embodiments thereof, it will be understood by those skilled in the art that the foregoing and various other changes, omissions and deviations in the form and detail thereof may be made without departing from the spirit and scope of this invention.

What is claimed is:

1. A computer implemented method for constructing square multi-resolution tiles for use with spatial multi-resolution raster data, the method comprising:
    defining a base level cell size for a highest required resolution;
    defining one or more lower resolution cell sizes for lower resolution tiles, wherein the lower resolution cell sizes are integer multiples of the base level cell size;
    defining a base level tile size wherein the integer multiples, as used in the step of defining lower resolution cell sizes, are all integer factors of a number of cells on a side of the base level tile;
    sampling the spatial multi-resolution raster cell data at the highest required resolution;
    storing the raster cell data sampled at the highest required resolution in base level size tiles;
    sampling the spatial multi-resolution raster cell data at the one or more lower resolutions;
    storing the raster cell data sampled at the one or more lower resolutions in respective multi-resolution size tiles; and
    wherein the spatial multi-resloution raster data is comprised in a single compound file, the single compound file includes a master file table that includes data that defines a plurality of subfiles contained in the single compound file, the subfiles include a plurality of raster data fields which are comprised of event data,
    wherein the event data is associated with a specific time marker and the event data indcludes data for a same geographic location at different points in time; and
    wherein changes to event data are stored as new data with a new time marker, thereby allowing temporal changes and editing to raster data without need to form a whole new set raster data.

2. The method of claim 1 further including steps of:
    determining a region of interest for display on a spatial map;
    selecting and displaying tiles formed at higher resolution for tiles of the spatial map that include the region of interest; and
    selecting and displaying tiles formed at lower resolution for tiles of the spatial map that do not include the region of interest, wherein tile boundaries for the higher and lower resolution tiles align without any spatial overlapping or gaps.

3. The method of claim 1 wherein the spatial multi-resolution raster data is stored in a data pyramid structure comprising a pyramid base level and one or more lower resolution overview levels.

4. The method of claim 3 wherein each level is arranged to include a spatial tile map that records what tiles exist in each respective level.

5. The method of claim 1 wherein the spatial multi-resolution raster data includes a plurality of fields, such fields including one or more of the following: RGB image data, numeric data, time data, text string data.

6. The method of claim 1 further including a step of using data compression to store the single compound file.

7. The method of claim 1 wherein the base level tile size is further selected to be a size closest to a size of 1024×1024 cells.

8. A computer system for constructing square multi-resolution tiles for use with spatial multi-resolution raster data, the system comprising computer storage for storing the spatial multi-resolution raster data and a processor with software configured for:
    defining, using the processor, a base level cell size for a highest required resolution;
    defining, using the processor, one or more lower resolution cell sizes for lower resolution tiles, wherein the lower resolution cell sizes are integer multiples of the base level cell size;
    defining, using the processor, a base level tile size wherein the integer multiples, as used in the step of defining lower resolution cell sizes, are all integer factors of a number of cells on a side of the base level tile;
    sampling, with the processor, the spatial multi-resolution raster cell data at the highest required resolution;
    storing, in the computer storage, the raster cell data sampled at the highest required resolution in base level size tiles;
    sampling, with the processor, the spatial multi-resolution raster cell data at the one or more lower resolutions;
    storing, in the computer storage, the raster cell data sampled at the one or more lower resolutions in respective multi-resolution size tiles;
    wherein the spatial multi-resolution raster data is comprised in a single compound file in the storage, the single compound file includes a master file table that includes data that defines a plurality of subfiles contained in the single compound file, the subfiles include a plurality of raster data fields which are comprised of event data,
    wherein the event data is associated with a specific time marker, and the event data includes data for a same geographic location at different points in time, and wherein changes to event data are stored as new data with a new time marker, thereby allowing temporal changes and editing to raster data without need to form a whole new set raster data.

9. The system of claim 8 where the processor and software are further configured for:
    determining, with the processor, a region of interest for display on a spatial map on a display;
    selecting, with the processor, and displaying, on the display, tiles formed at higher resolution for tiles of the spatial map that include the region of interest; and
    selecting, with the processor, and displaying, on the display, tiles formed at lower resolution for tiles of the spatial map that do not include the region of interest, wherein tile boundaries for the higher and lower resolution tiles align without any spatial overlapping or gaps.

10. The system of claim 8 wherein the spatial multi-resolution raster data is stored, in the storage, in a data pyramid structure comprising a pyramid base level and one or more lower resolution overview levels; and wherein each level is arranged to include a spatial tile map that records what tiles exist in each respective level.

11. The system of claim 8 wherein the spatial multi-resolution raster data includes a plurality of fields, such fields including one or more of the following: RGB image data, numeric data, time data, text string data, and wherein multiple bands of data are stored for more than one data field for raster data cell values.

12. The system of claim 8 wherein the processor is further configured to use data compression to store the single compound file in the storage.

13. The method of claim 5 wherein multiple bands of data are stored for more than one data field for raster data cell values.

* * * * *